Sept. 21, 1965     B. M. TINKLEPAUGH     3,207,615
PROCESS FOR PREPARING SPECIMENS FOR
MICROPHOTOGRAPHIC EXAMINATION
Filed April 19, 1962

INVENTOR.
BETTY M. TINKLEPAUGH
BY *Edward H. Lang*
ATTORNEY

United States Patent Office 3,207,615
Patented Sept. 21, 1965

3,207,615
PROCESS FOR PREPARING SPECIMENS FOR MICROPHOTOGRAPHIC EXAMINATION
Betty M. Tinklepaugh, Crystal Lake, Ill., assignor to The Pure Oil Company, Chicago, Ill., a corporation of Ohio
Filed Apr. 19, 1962, Ser. No. 188,832
7 Claims. (Cl. 117—4)

This invention relates to new and useful improvements in processes for treating rock samples in preparation for testing. More particularly, this invention is concerned with the preparation of core samples from wells for cutting into thin sections suitable for microscopic and microphotographic observations of pore patterns and porosity distributions in rock specimens.

In drilling oil, gas, and other types of wells, it is conventional practice to take samples of the strata through which the drill has passed. These samples are usually taken in the form of cores of rock from the strata and are analyzed for such properties as permeability, porosity, saturation, interstitial water, etc. In previous geological investigations, one technique used in the study of rock samples or cores has been to prepare thin sections of rock samples for microscopic study of pore patterns and sizes. However, before thin sections can be cut from the rock sample it is necessary to fill the pores with a material which will bind together the particles and prevent disintegration during the cutting and polishing operations, and which will render the pores readily discernible from the particulate matter making up the rock.

In the past, certain plastics and other materials, ranging from Canada balsam to varnishes and cerecin wax have been used for this purpose, but have all been deficient in one or more respects. In addition, dyes and pigments have been added to the plastic fillers and binders to make the filled pores easier to distinguish from the rock under the microscope. In making photomicrographic studies of thin sections of well cores, color photography has been resorted to to distinguish between pores which are filled with plastic materials, and clays and other materials which may tend to clog the porous structure of the rock. When photomicrographic studies are made of thin sections of plastic-impregnated rock, using black and white photography, it is practically impossible to distinguish between the grey areas which consist of clay and other soft material and similar areas which are open pores filled with plastic. When the filler and binder material is properly colored and color photography is used in the photomicrographic study, it is easy to distinguish between the pores of the rock and clay materials which may fill the pores. In the past, the plastic materials used for impregnation of rock samples have generally been subject to the objection that they shrink unduly and thus do not fill the pores of the rock adequately and in many cases the plastics fuse or smear during the cutting operation in which thin sections are cut from the impregnated sample.

Another difficulty which has been encountered in prior art techniques has been the lack of satisfactory dyes for use with resins which have the properties needed for impregnating and binding a rock sample. Unfortunately, many of the dyes used heretofore have been relatively insoluble in the plastics in which they were used and have been filtered from the plastic as they passed through the pores of the rock leaving a colored outer portion of the plastic-saturated rock, and an uncolored residue of plastic in the center of the rock sample. Most of the other dyes which have been used have been susceptible to bleeding from the solidified binder and filler when heated by the cutting and polishing operations necessary for the preparation of the thin rock sections. Consequently, the dyes have smeared across the surface of the thin sections and have caused considerable difficulty in subsequent microscopic examination.

It is therefore one object of this invention to provide a new and improved method for treating rock samples, such as well cores, to facilitate cutting of the sample into thin sections for microscopic and photomicrographic examination.

Another object of this invention is to provide an improved method for impregnation of well cores using a plastic material which is of low viscosity and contains in solution a dye which identifies the porous area of the rock for microscopic or microphotographic observation.

A feature of this invention is the provision of an improved method in which a rock sample is washed or flushed with a volatile solvent, dried, and evacuated, and then impregnated with low-viscosity epoxy resin containing an oil-soluble dye, the impregnated sample being cured by heating and then cut into thin sections suitable for microscopic or photomicrographic observation.

Other objects and features of this invention will become apparent from time to time throughout the specification and claims as hereinafter related.

This invention is based on my discovery of a combination of plastic and dye for use in an improved method for impregnating rock samples, which method is substantially completely free of the deficiencies of previous fillers and binders. In my process a rock sample, such as a well core, is washed or flushed with a volatile solvent, such as toluene, and dried in an oven. The rock sample is then subjected to a relatively high vacuum for about 45 to 90 minutes to remove all volatile materials and gases from the pores thereof. After being thoroughly evacuated, the rock sample is impregnated with a plastic-dye mixture by first opening the evacuated container of the mineral sample to a reservoir containing the plastic and dye mixture in a liquid form whereupon the plastic flows around and through the sample and fills the pores thereof. The plastic liquid is subjected to a relatively high pressure, e.g., 100 p.s.i.g. or higher, of an inert gas such as nitrogen or helium to cause the plastic to be forced thoroughly into the innermost pores of the rock sample. The impregnated rock sample is then cured by heating to a suitable curing temperature, viz., about 160–165° F., for several hours. After the impregnated rock sample is thoroughly cured, it is cut and polished into very thin section, e.g., of 0.02 mm. thickness, suitable for microscopic or microphotographic examination.

The superior binder and filler of this process consists essentially of a thermosetting epoxy resin in combination with an azobenzene-naphthol dye, preferably tetrazobenzene-$\beta$-naphthol, a red, oil-soluble dye, also known as Sudan III (G). Preferably, the epoxy resin is aromatic in character and is selected so that it is transparent when set and so that the combined resin intermediates, hardener, and dye form a liquid composition having low viscosity.

A specific combination of plastic and dye which I have found to be ideally suited as a filler and binder for rock specimens from which thin sections are to be prepared is described in a specific example which follows. Some of the characteristics of my composition which lead to saturation of the rock specimen, and other desirable end results, are as follows:

(1) The mixed intermediates, hardener, and dye, being of low viscosity, can be easily forced under moderate pressure into evacuated pores of the rock specimen.

(2) The mixture of intermediates, hardener and dye has a long pot life and is easy to handle, thereby avoiding the danger of having the plastic set in the impregnating apparatus.

(3) The resin does not shrink to a significant degree as it sets, thus preventing the formation of open voids around the edges of the pores between the pore wall and the plastic.

(4) The dyed plastic is colorfast throughout all of the temperatures to which the specimen is subjected during the cutting and polishing operations.

(5) The dye-plastic combination is resistant to all of the solvents normally used in the preparation of the thin sections.

(6) Because the rock is wet by the liquid mixture of intermediate, hardener and dye, impregnation is aided by capillary forces, the dye-combination having excellent adhesion to a variety of solids.

(7) The dye is not filtered from the liquid as it passes through the rock specimen.

(8) The dye-plastic combination is resistant to fracture, chemical action, and high temperatures.

(9) After the thin sections have been prepared, the dye-plastic combination stands out clear, colored, and distinctive from the sand grains and other constituents of the rock. Pore sizes and patterns and porosity distributions stand out in detail and can be photographed easily in color.

The following non-limiting example is illustrative of the scope of this invention.

*Example I*

A liquid mixture consisting of 80 parts by weight of the diglycidyl ether of bisphenol-A (epoxide equivalent of 175 and average molecular weight of 145), 20 parts by weight of epichlorohydrin-ethylene glycol condensate (epoxide equivalent 330), 7 parts by weight of N-aminoethylpiperazine (hardener), and 0.55 part by weight of tetrazobenzene-$\beta$-naphthol (Sudan III (G) dye was prepared and was used to impregnate a rock specimen from which thin sections were to be prepared. The rock specimen was evacuated, and the liquid was added under a nitrogen gas pressure of about 200 p.s.i.g. After the specimen had been saturated with the liquid, it was heated at 160–165° F. for about 16 hours to cause the epoxy resin to cure and harden.

Thin sections (about 0.02 mm. thickness) were readily prepared from the resulting rock specimen without encountering the problem of small particles breaking from the rock, or bleeding and smearing of the dye. The plastic-filled pores in the thin sections were bright red in color and were easily discernible from the rock constituents in color photographs taken through a microscope. The results obtained were far superior to those obtained by prior art methods.

While not essential to this invention, an understanding of the reasons why the dye is not filtered from the liquid, or does not bleed from the set plastic, is desirable. It appears probable that the dye is dissolved in the plastic and is thus held within the very fine, rigid lattice structure of the resin, or that the dye actually forms a chemical bond with the structure of the resin. It is also possible that both phenomena occur to some extent.

To provide a complete understanding of the process of this invention, there is shown in the accompanying drawings a preferred embodiment of the apparatus used in carrying out this process, and views illustrating the cutting of thin rock specimens and a microscopic view of one such specimen.

In order to more fully describe the present invention, reference is made to the accompanying drawings in which.

Figure 1:
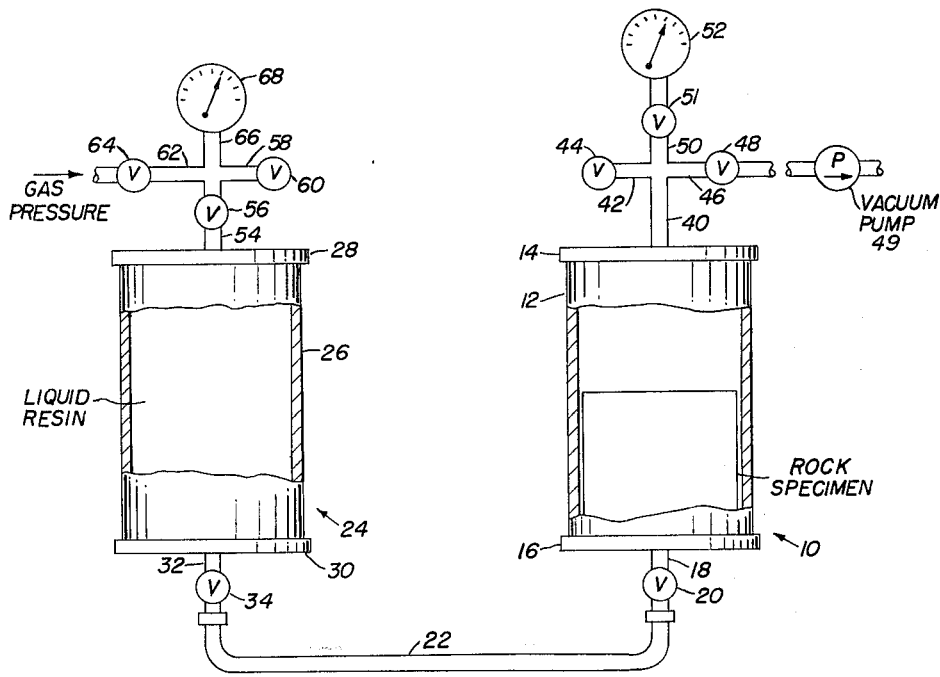
FIGURE 1 represents a side elevation view, partly broken away, of a preferred apparatus for carrying out a process according to this invention.

Referring to the drawings by numerals of reference, and more particularly to FIGURE 1, there is shown a preferred embodiment of the apparatus used for carrying out this process. Specimen vessel 10 consists of pipe 12 and threaded pipe caps 14 and 16. Tubing 18 is connected to cap 16 and provided with valve 20 connected in turn to tubing 22. Liquid reservoir 24 consists of pipe 26 and caps 28 and 30. Cap 30 is connected to tubing 32 and valve 34 which is in turn connected to tubing 22.

Cap 14 on vessel 10 is connected to tubing 40 which, in turn, is connected to vent 42 provided with outlet valve 44. Tubing 40 is also connected to tubing 46 having valve 48 connected to vacuum pump 49, and to tubing 50 on which is mounted valve 51 and vacuum gauge 52. Cap 28 on vessel 24 is provided with conduit 54 having valve 56, the conduit in turn being connected to vent line 58 with valve 60 thereon. Conduit 54 is also connected through valve 56 to line 66 on which is mounted pressure gauge 68, and to line 62 with valve 64 connected to a source of gas pressure, such as nitrogen or helium.

In accordance with the method described in Example I above, a core sample is cut into a cylindrical plug, 1½" diameter and 2" long (which just fits within vessel 10) and the plug is flushed or extracted with toluene and then dried at about 150° F. The plug is then placed in vessel 10 and valves 34 and 44 are closed and valves 48, 51, and 20 opened to subject the plug to evacuation by vacuum pump 49. The plug is preferably subjected to a vacuum of about 1–5 mm. Hg. for a period of 45 to 90 minutes to assure complete evacuation of volatile matter from the pores of the rock. If desired, more than one rock sample can be treated at one time by making pipe 12 of vessel 10 of sufficient length.

Reservoir 24 is filled with the plastic, hardener, and dye mixture described in Example I, valve 60 is closed, and valves 56 and 64 opened to apply gas pressure to the liquid. When the rock specimen in vessel 10 has been under vacuum for the required time, valves 48 and 51 are closed and valve 34 is opened slowly to allow the liquid resin mixture to enter vessel 10. The gas pressure on the liquid resin is in excess of 100 p.s.i.g. and preferably about 200 p.s.i.g., although higher gas pressures can be used. After the pressurized liquid resin has been in contact for a sufficient time (about 1½ to 2 hours) to achieve saturation of the mineral specimen, valves 34 and 20 are closed, and the vessels are vented by opening valves 44 and 60.

Next, vessel 10 is dismantled, and the impregnated rock specimens are transferred to suitable containers, such as paper cups lined with aluminum foil, for baking. The specimens containing the composition described in Example I are cured by heating in an oven at 160–165° F. for about 16 hours. After the specimens have been removed from vessel 10 and any remaining liquid resin has been drained from vessel 24 all of the parts are disassembled and washed with acetone to remove the residual plastic before it begins to set.

Figures 2, 3:
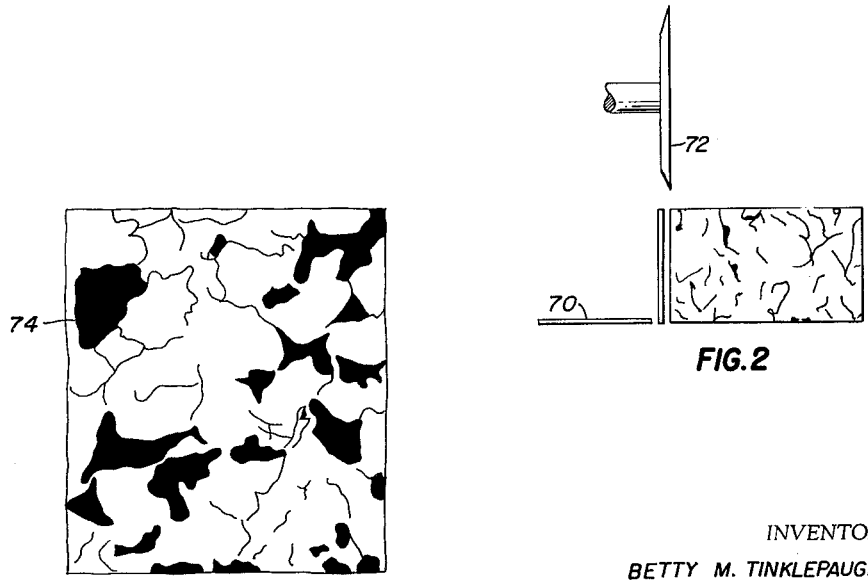
FIGURE 2 represents, respectively, a schematic view of a cutter and views of thin core sample sections produced in accordance with this invention.
FIGURE 3 represents an enlarged top plan view of a photomicrograph of a thin core sample cutting or section produced by a process of this invention.

After the impregnated rock specimen has been thoroughly cured in the oven, it is removed and cut into thin sections 70 by a suitable cutter 72 as shown in FIGURE 2. The thin sections are preferably about .02 mm. in thickness. These thin sections of plastic-impregnated rock sample are suitable for microscopic or microphotogracphic observation. Preferably, the samples are photographed in color using a suitable microphotographic apparatus. A black and white reproduction of a typical photograph of such a sample is shown in FIGURE 3. The dark areas 74 in FIGURE 3 appear red in the photomicrograph and represent open pores in the rock which have been filled with the colored plastic. From microphotographs of this type, it is possible to evaluate the porosity of the rock more accurately than has been previously possible.

While I have described my invention fully and completely with special emphasis upon a preferred embodiment, I wish it to be understood that within the scope of the appended claims this invention may be practiced otherwise than as specifically described herein.

The specific embodiments in which an exclusive privilege or property is claimed are as follows:

1. A method for treating a porous rock sample which comprises
   (a) flushing the porous sample with a volatile solvent,
   (b) subjecting the porous sample to vacuum to remove volatile materials,
   (c) impregnating the sample with a liquid comprising epoxy resin of low viscosity containing a hardener and an azobenzene-naphthol dye, said dye being soluble in said epoxy resin, and
   (d) curing the impregnated sample at a moderately elevated temperature.

2. A method in accordance with claim 1 in which the cured sample is cut into one or more thin sections suitable for microphotographic observation.

3. A method in accordance with claim 1 in which impregnation with liquid resin is carried out under elevated pressure.

4. A method in accordance with claim 1 in which the dye is an oil-soluble tetrazobenzene-β-naphthol dye.

5. A method in accordance with claim 1 in which the epoxy resin comprises a mixture of diglycidyl ether of bisphenol-A and an epichlorohydrin-glycol condensate.

6. A method for treating a porous rock sample which comprises
   (a) flushing the porous sample with toluene and drying,
   (b) subjecting the porous sample to vacuum for about 45–90 minutes,
   (c) impregnating the porous sample with a liqued resin comprising a mixture of the diglycidyl ether of bisphenol-A and an epichlorohydrin-glycol condensate, an amine hardener, and an oil-soluble tetrazobenzene-β-naphthol dye, said dye being soluble in said liquid resin, under an inert gas pressure in excess of about 100 p.s.i.g., for about 1½ to 2 hours,
   (d) curing the impregnated sample at about 160° F., and
   (e) cutting the cured sample into at least one section of a thickness suitable for microphotographic observation.

7. A method for preparing a porous core sample for cutting which comprises
   (a) flushing the porous core sample with a volatile solvent,
   (b) subjecting the porous core sample to a vacuum of about 1–5 mm. of mercury to remove volatile material,
   (c) impregnating the porous core sample with a liquid comprising an epoxy resin of low viscosity, an amine hardener, and an azobenzene-naphthol dye, said dye being soluble in said epoxy resin, and
   (d) heating the impregnated sample formed at an elevated temperature until the epoxy resin is substantially completely cured.

References Cited by the Examiner

UNITED STATES PATENTS

| | | | |
|---|---|---|---|
| 2,135,047 | 11/38 | Carpenter | 51—277 |
| 2,705,223 | 3/55 | Renfrew et al. | 117—161 |
| 2,867,543 | 1/59 | Braun | 117—119 |
| 2,932,583 | 4/60 | Grana | 117—119 |
| 2,968,866 | 1/61 | Soper et al. | 117—161 |
| 3,008,917 | 11/61 | Park et al. | 117—123 |
| 3,071,496 | 1/63 | Fromm et al. | 117—119 |
| 3,099,574 | 7/63 | Bernier | 117—123 |

OTHER REFERENCES

Hodgeson and Rosenberg: Journal of the Chemical Society, page 2787, 1930.

Exley, C.S.: A Method of Impregnating Friable Rocks for the Cutting of Thin Sections, Mineral Magazine, vol. 31, pp. 347 to 349, 1956.

RICHARD D. NEVIUS, *Primary Examiner*.